United States Patent [19]

Hohlfeld et al.

[11] Patent Number: 5,278,954
[45] Date of Patent: Jan. 11, 1994

[54] SYSTEM FOR AND METHOD OF STORING IMAGE DATA PROCESSED IN MULTIPLE STAGES

[75] Inventors: Robert G. Hohlfeld, North Attleboro; Jonathan B. Ellis, Arlington; Anshu Aggarwal, Boston; Thomas W. Drueding, Allston, all of Mass.

[73] Assignee: Analogic Corporation, Peabody, Mass.

[21] Appl. No.: 580,832

[22] Filed: Sep. 11, 1990

[51] Int. Cl.⁵ ............................................. G06F 15/20
[52] U.S. Cl. .................................. 395/164; 395/160; 395/162
[58] Field of Search .................. 395/162, 164–166, 160, 600, 425, 375; 340/798–800

[56] References Cited

U.S. PATENT DOCUMENTS

| | | | |
|---|---|---|---|
| 3,972,026 | 7/1976 | Waitman et al. | 395/145 |
| 4,660,029 | 4/1987 | Honda et al. | 395/164 |
| 4,803,651 | 2/1989 | Galkowski | 395/500 |
| 4,928,247 | 5/1990 | Doyle et al. | 395/164 |

OTHER PUBLICATIONS

"Fundamentals of Data Structures" by Horowitz et al. Computer Science Press, 1983.

Primary Examiner—Dale M. Shaw
Assistant Examiner—Kee M. Tung
Attorney, Agent, or Firm—Schiller & Kusmer

[57] ABSTRACT

An automatic organization of images in computer memory is provided as a doubly-linked (or multiply-linked) list data structure which reflects in its interconnections to relationships between various stages in complex image processing tasks. Data structures, implemented in an appropriate high-level computer language such as C, contain pertinent information about the image as well as pointers (memory addresses) to other data structures and their associated images. These pointers allow the construction and maintenance of the linked list relationships between images. Since the relationships between images in the linked lists are equivalent to the relationships between stages of image processing tasks, the complex tasks of image processing are automatically documented in the linked list data structure without the necessity of maintaining an auxiliary written record. Furthermore, considerable flexibility in developing novel image processing tasks is obtained as well as advantages in managing the memory requirements in image processing and avoiding redundant computation of quantities already stored in the image data structure.

14 Claims, 3 Drawing Sheets

```
#define    MAXINTENS    255
#define    MININTENS    0
#define    _MAX_H_ITEM  22
#define    _MAX_H_WDTH  78
#define    FALSE        0
#define    TRUE         1
#define    X_SIZE       512
#define    Y_SIZE       480

/*    DATA STRUCTURE FOR IMAGES           */ struct screen {
  char text [22][80];            /* One screen's worth of text. */
};

struct quanflags { unsigned histo:1;
  unsigned mean:1;
  unsigned var:1;
  unsigned skev:1;
  unsigned kurt:1;
  unsigned energy:1;
  unsigned entropy:1;

};

struct IMAGE {
  unsigned char huge *image;       /* pointer to image data   */ struct IMAGE *parent;      /* pointer to image parent  */
  struct IMAGE *child;       /* pointer to head child    */
  struct IMAGE *left;        /* pointer to left sibling  */
  struct IMAGE *right;       /* pointer to right sibling */

/* IMAGE PARAMETERS     */ int    xsize, ysize;      /* image dimensions              */
  int    xpos, ypos;        /* upper-left position of window */
  int    jump;              /* number of pixels to jump      */
  long   offset;            /* offset into image from parent */
  unsigned short handle     /* index for address in extended memory */

/* DERIVED QUANTITIES  */ long      histo[MAXINTENS +1];    /* intensity histograms  */
  float     mean;                   /* 1st order stats       */
  float     var;
  float     skev;
  float     kurt;
  float     energy;
  float     entropy;
  struct quanflags flag;

/* IMAGE DOCUMENTATION AND PROCESSING HISTORY   */ char   status;             /* image status: (p, l, d)   */
  char   describe[31];    /* image description (name or other) */
  char   history[_MAX_ITEM+1][_MAX_H_WDTH+2]; /* processing history*/ char   errflags[22];       /* error flags on function calls */

/* end of structure definition  */
```

Fig. 6

SYSTEM FOR AND METHOD OF STORING IMAGE DATA PROCESSED IN MULTIPLE STAGES

The present invention relates generally to data storage, and more particularly to organized storage of image information generated in a multiple stage imaging process.

BACKGROUND OF THE INVENTION

Microprocessor-based computer systems are becoming increasingly capable of image-processing tasks which thus far have been the province of mainframe computers and special purpose hardware. Nonetheless, the large memory and computational requirements of image processing place a premium on efficient utilization of computer memory and effective organization of computations.

Many image processing tasks require several stages of processing, each of which generates an image as its data product, which is then used as the input data of the next stage of image processing. For example, consider the processing of an image to produce an edge map, as is frequently required in industrial quality control applications or in machine vision. First an image is acquired using an electronic camera and stored in random-access memory of the computer. This image then is convolved with an edge-enhancement mask (such as a $3 \times 3$ Laplacian mask, for example) to yield an edge-enhanced image. Next, the pixel intensities of this image are tabulated to produce a histogram, which in turn is analyzed to select one or more threshold intensity values. The individual intensity values of the edge-enhanced image are then compared to the selected threshold intensity values so as to yield an edge map which is usually a binary image (where all of the individual intensity values are compared to a single selected threshold intensity value and the image consists of two levels of intensity only, i.e., one level representing the individual intensity values above the selected threshold and the other level representing individual intensity values below the selected threshold). Owing to noise in the original image, irregularities in illumination, or other problems, the edges in the edge map may not be geometrically continuous and one or more cycles of dilation and erosion of the edge map may be required to yield a satisfactory edge map suitable for subsequent analysis.

Several observations may be made with respect to this example: First, during the processing at least four separate images are generated, each image depending upon earlier stages of processing. Secondly, in general, the entire process, and in particular, the computation of the edge-enhanced image by convolution of an edge-enhancement mask with the original image, is a time-consuming computation operation. Thus, if an error is made in processing the image data during one of the later stages of processing, e.g. if the thresholds are not selected correctly in the computation of the edge map, it would be an unnecessarily wasteful use of computer time to reprocess the original image through all of the multiple stages. Thirdly, information useful in later stages of analysis, such as the pixel intensity histogram, should be permanently associated with the image so as to be available for later analyses and without having to be recomputed.

In common practice when processing images through a series of stages, such as the process described above, the available memory is arranged in a series of buffers, each of which may contain an image or a portion of an image. These buffers may be randomly selected and bear no particular arrangement to each other. It is therefore incumbent upon the user to impose an order on this memory which is appropriate to the task at hand. This organization is not automatic in the current state of the art. Further, any auxiliary information describing or documenting the image must be stored elsewhere and connecting that information with the corresponding images themselves is again a separate task imposed on the user.

In addition, when storing the image in a file, the general practice is to retain only minimal information about the image, typically its size and name.

OBJECTS AND SUMMARY OF THE INVENTION

It is a general object of the present invention to substantially reduce or overcome the above noted disadvantages of the prior art.

A more specific object of the present invention is to provide a more efficient and useful system and method of storing statistical information generated by the processing of the image, a history of the processing done on the images, and documentation or annotation supplied by the user to describe the image as well as the name and size of the image.

Yet, another more specific object of the present invention is to provide a system for and method of automatically organizing data structures in computer memory as linked listed data structures which are equivalent to the corresponding underlying mathematical structure of the image processing tasks of the multiple stages of processing.

Another, more specific object of the present invention is to provide an improved system for and method of automatically organizing these data structures in a natural way and providing self-documentation of complex image processing tasks.

And another object of the present invention is to automatically associate with an image in its image data structure auxiliary information which documents the image or may be utilized in subsequent image processing operations.

Yet another object of the present invention is to provide a system for and method of minimizing the necessity of recomputing such information and thus reducing the computation load of the image processing tasks.

Still another object of the present invention is to use the image data structure as a flexible framework for the development of image processing procedures, as, for example, allowing for the convenience of experimenting with different parameters on different branches of a data structure tree which all originate from the same image data structure node.

And yet another object of the present invention is to utilize the flexibility of the data structural approach to facilitate error recovery by traversing the data structure linked list in the reverse direction to return to an earlier state in the image processing.

And still another object of the present invention is to avoid repeatedly carrying out computationally demanding tasks as a result of errors.

And yet another object of the present invention is to provide a system and method utilizing a data structural approach so as to facilitate adoption of a uniform programming standard for the implementation of image processing subprograms and encourage the use of an object-oriented programming style.

Finally, an object of the present invention is to facilitate memory management and recovery of memory no longer required for the representation of images. This is important since images often require significant amounts of computer memory.

These and other objects are achieved by applying methodologies in the theory of data structures and multiply-linked lists to the construction of image data structures and linked lists of these image data structures whose linkages reflect the underlying mathematical structure of these complex image processing tasks. This approach results in the organization of image processing tasks and the automatic association of auxiliary information with images. Substantial benefits are obtained in ease and flexibility of operation, the management of computer memory, and in savings in computer processing time.

Other objects of the invention will in part be obvious and will in part appear hereinafter. The invention accordingly comprises the apparatus possessing the construction, combination of elements, and arrangement of parts, and the processes involving the several steps and the relation and order of one or more of such steps with respect to each of the others, all of which are exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein:

FIG. 6 is a listing of the preferred files of each data structure shown in FIGS. 2 through 5.

DETAILED DESCRIPTION OF THE DRAWINGS

Figure 1:
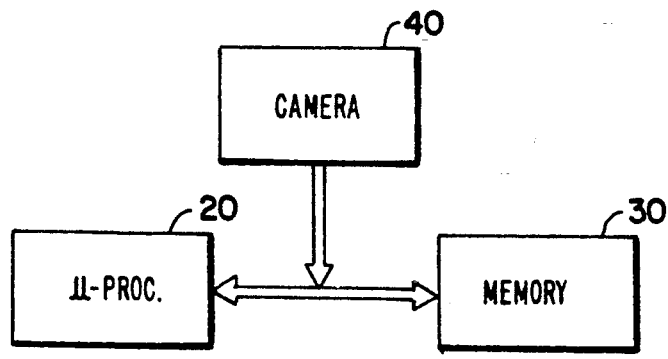
FIG. 1 is a typical system adapted to be programmed so as to achieve the present invention.

The preferred implementation of the data structural methodology for image processing will now be described. As shown in FIG. 1, the system 10 for performing the process includes a microprocessor 20 and memory 30. The particular microprocessor and the size of memory can clearly vary depending upon the desired processing speed, the size of each image to be processed, the number of anticipated processing tasks, the total amount of data to be stored, etc. For example, a Model AT manufactured and sold by IBM or compatible systems and having two Megabytes of random access memory (RAM) may be suitable for many applications. Other systems will be evident to those knowledgeable in the art. System 10 also includes means, such as a camera 40, for providing a data input to system 10 representing the pixel information of an image viewed by the camera.

In accordance with the present invention, data is automatically organized and stored in a novel way so that certain underlying mathematical structure and historical information of the image is represented by a separate data structure for each image generated in accordance with each of a series of complex image processing tasks. The data structures are automatically linked to one another so as to allow easy reprocessing of any of the processing tasks without the need to reprocess from the beginning. It is conventional to make schematic diagrams of linked lists and data structures in which contiguous regions of computer memory are indicated as blocks, and pointers (i.e., specific memory addresses) to memory locations are indicated by arrows.

Figure 2:
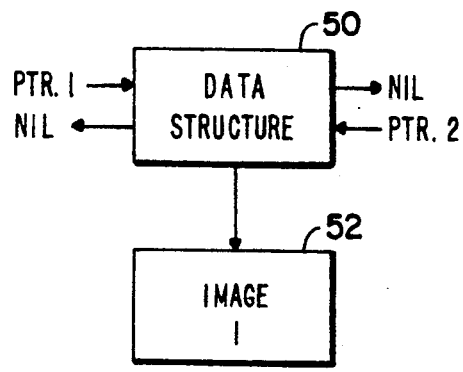
FIG. 2 is a schematic diagram representing the relationship of a single data structure associated with a particular image (represented by pixel values stored in computer memory)

In accordance with the present invention, upon acquisition of an image from an external input source, such as camera 40 of FIG. 1, a data structure is created, as indicated in FIG. 2. The data structure, indicated at 50, contains information associated with the image and a collection of pointers which are used to construct the structure of the linked list. The data structure is automatically referenced by a pointer, indicated by the arrow PTR1, which is a specific address in memory where the "beginning" of the data structure, i.e., the head of the list contained within the data structure, can be found. As described in greater detail hereinafter in connection with FIG. 5, the data structure 50 automatically contains within its data a pointer which refers to the address in memory where the data representing the pixel information of the underlying image 52 begins. Thus, access to the actual data representative of the pixel information of the underlying image 52 is by indirect addressing through the image data structure 50. Pointers which are presently unassigned have a nil value. The pointer, indicated by the arrow PTR2 is shown to illustrate that the data structure will be pointed into from outside the data structure, presumably by other data structures created during the image processing procedures, as shown in the succeeding figures.

Figure 3:
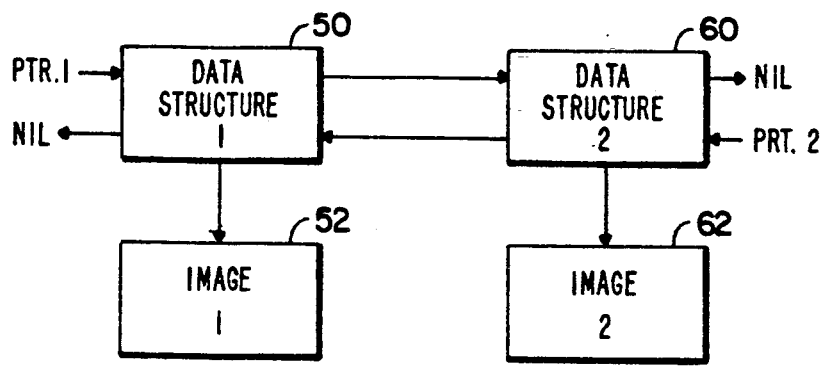
FIG. 3 is a schematic diagram representing the relationship of two doubly-linked data structures associated with corresponding images (represented by pixel values stored in computer memory)
Figure 4:
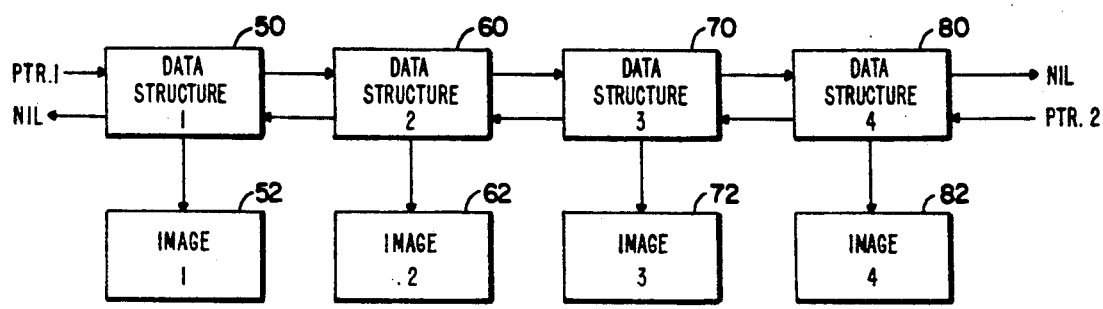
FIG. 4 is a schematic diagram representing the relationship of four doubly-linked data structures associated with corresponding images (represented by pixel values stored in computer memory)
Figure 5:
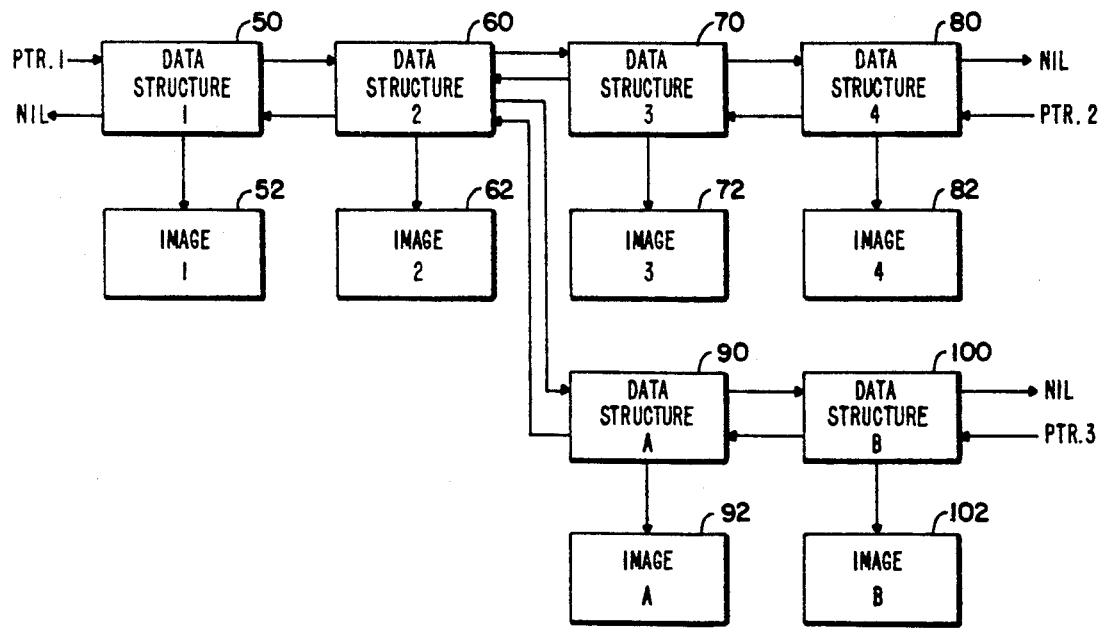
FIG. 5 is a schematic diagram representing the relationship of six data structures associated with corresponding images (represented by pixel values stored in computer memory) some of which have been multiply-linked.

For ease of representation, the blocks for the data structure and the underlying image in FIG. 2, as well as those shown in FIGS. 3 through 5, are of equal size. In practice, data representative of the pixel information of the images occupy much more computer memory than their associated data structures. For example, an image of 512 by 512 pixels, with each pixel taking on one of 256 possible gray scale intensity levels, requires ¼ Mbyte of memory, while the size of the data structure is only of the order of a few kilobytes. Thus, the penalty in memory usage in the data structural approach is quite modest compared to the gains achieved.

If an image processing task is carried out, for example an edge-enhancement mask is applied to image 52, a new image 62 and data structure 60 are created, linked to the first image data structure 50 by pointers (see FIG. 3). This data structure 60 now is an elementary form of a doubly-linked list. The pointer PTR1 points to the head of the list of the data structure, while the pointer PTR2 points to the tail (i.e., the end) of the list contained within the data structure. The double link between image data structures permits the user to traverse the list (by indirect addressing) in either direction. This ability to return to earlier stages of image processing is useful in error recovery.

As shown in FIG. 4, if additional stages of image processing are carried out (as for example two additional stages represented by the data structures 70 and 80 and the underlying images 72 and 82), a linked list data structure is obtained. It is shown here how nil-valued pointers are used to indicate when the end of the linked list is obtained when it is traversed in either direction.

It is possible for branches to occur in the image processing task, for example if parameters (such as thresholds) are selected on which subsequent processing depends, or if alternative image processing is investigated. Such a situation generates a linked list with a branch, as indicated in FIG. 5, wherein the data structure 60 contains pointers to both data structure 70 and data structure 90. Data structure 90 and 100 are provided with the corresponding underlying images 92 and 102. In this regard the situation shown in FIG. 5 uses multiply-linked lists, at least within data structure 60. Note that the linked list may be traversed in such a fashion that any image data structure is accessible from any other image data structure by use of indirect addressing and pointers to list elements.

Owing to the large amount of memory required to represent the pixel data of typical images, issues of memory management are of great practical concern. Effective memory management is readily accomplished in the context of this data structural approach to image processing. As in FIG. 5, if a branch of the image processing task being investigated, say for images 72 and 82, is no longer relevant, that branch may be "pruned". In that circumstance the links to the data structures for images 72 and 82 are broken (the pointer values are reassigned) and the associated memory may be recovered for later use.

When large, complicated tree structures are considered, removal of a node (i.e. a data structure and its underlying image) may result in two or more independent (that is, disconnected) linked list data structures. This is permissible and the resulting linked lists may then be processed independently. It is also advantageous, in some circumstances, for multiple data structures to refer to the same image, though this situation arises in practice only when no operations have been undertaken which modify image data.

One of the items which is useful to include in the data structure is a running history of all the operations which have been performed on the image up until that point in the image processing. This "history file" contained within the data structure (in some implementations this is technically not a file, but rather merely some reserved portion of the data structure) provides a self-documented record of the operations performed in carrying out an image processing task. As this history file is being continually updated in successive data structures, for example in FIG. 5, the history file in data structure 90 will contain one more entry than the history file in data structure 60.

Since the history file contains all the operations which must be carried out to produce an image, the history file may be read out of the image data structure and used as a "script" for automated image processing. This script may be applied as a list of operations which will generate a new linked list data structure containing processed images. These processed images would be different from the original images since the input data was different, but the structure of the linked list data structure would be independently replicated. This is a useful technique for generating and implementing image processing procedures which then can run in an automated fashion with minimal operator intervention. No programming is required, since the creation of a single linked list to a desired processed image generates sufficient information in the history file of the terminal data structure to allow automated image processing.

FIG. 6 illustrates a concrete example, written in the language C, of the preferred implementation of the data structure used in this linked-list approach to organizing image processing. First a collection of "#define" statements are used to define a collection of standard parameters. These include the maximum and minimum pixel intensities, MAXINTENS and MININTENS, the maximum number and maximum size of items in the accumulated history of an image, respectively _MAX_H_ITEM and _MAX_H_WIDTH, logical values of FALSE and TRUE and the default numbers of pixels in the horizontal and vertical directions, X_SIZE and Y_SIZE.

Two data structure types are defined to be included in the image data structure definition. The first is "screen", which is designed to contain a screen's worth of text, 80 columns by 22 lines. The second structure is denoted "quanflags", which is a collection of indicators used to denote whether particular quantities identified by these variable identifiers have been computed and deposited in the corresponding image data structure. The actual quantities are discussed in more detail below. If a function applied to an image requires one of the quantities, say the "mean pixel intensity", the function first inspects the appropriate flag to determine if a valid value for the mean pixel intensity already exists, so as to avoid repeating this computation, if possible.

The image data structure proper is then defined, denoted IMAGE in this example. The first item contained in IMAGE is the pointer to the image from its associated data structure. Following this are four pointers which are used to point to the data structures of other images. Due to the analogy between the trees of image structures to genealogical trees, genealogical terminology has been used for conceptual clarity. For example, in FIG. 5, the second image data structure 60 is the parent of the third image data structure 70 and the child of the first image data structure 50. Also data structure 70 is the right sibling of the image data structure 90, and likewise the latter image data structure 90 is pointed to by the left sibling pointer in the image data structure 70. Thus, the overall structure of the linked list data structure is maintained by assigning values (i.e. memory addresses) to these pointers.

The next items in the data structure refer collectively to the representation of images in memory. The first, "xsize" and "ysize" refer to the number of pixels in the horizontal and vertical directions. Values assigned to "xpos" and "ypos" of the image referred to through this data structure are a window (delimited region) in a larger image. For such a window, the parameters "jump" and "offset" are used to manipulate pointers within that window. Lastly, an extension to the usual memory address is included to handle specific limitations of addressing extended memory in the DOS operating system. (This is not a fundamental issue and is not required in other operating systems.)

The image data structure also includes a series of descriptive properties which may be derived from operations applied to the image. In the preferred implementation these are primarily statistical, though other kinds of information can be stored as well. The first of these quantities is an intensity histogram designated "histo[-MAXINTENS+1]". In this histogram, each bin (say the 178th bin) contains the number of pixels in the image with the intensity value of the bin number (intensity of 178). The entries "mean" and "var" contain the mean pixel intensity and the variance (standard deviation squared) of the pixel intensity distribution, respectively. The entries "skew" and "kurt" refer to the skewness and kurtosis of the distributions, quantities arising in higher-order (second order) statistics. The "energy" and "entropy" of the image are indicated by the last two entries of this set. The first represents the energy content in the spectral sense of Parseval's theorem, while the entropy represents the logarithm of the information content in bits. Following these entries is the list of flags in the structure flags provided under "quanflags", which is used to denote whether valid values of the corresponding values have been computed.

The last category of information stored in the image data structure relates to the image documentation and the image's processing history. The first item is an image "status" for containing codes for the position of the image in the linked list of data structures, that is whether the image is a "parent" or an "independent" or "dependent" child. This information is used for editing the linked list data structure. The next item, "describe", is a short character string documenting the image, e.g. a title entered by the operator. Next is the processing history, "history[_MAX_H_ITEM+1][_MAX-_H_WDTH+2]" which is implemented as a collection of character strings, each of which contains a description of one of the stages in processing used to create the image referred to through this data structure. The last item, "errflags", is a collection of error flags each of which refers to one entry in the processing history and indicates whether the associated function call has generated an error return.

It should be appreciated that the foregoing provides a system for and method of automatically organizing data structures in computer memory as linked listed data structures which are equivalent to the corresponding underlying mathematical structures of the image processing tasks of the multiple stages of processing. These data structures are automatically organized in a natural way and provide selfdocumentation of complex image processing tasks. The image data structure are adapted to contain auxiliary information which documents the underlying image or may be utilized in subsequent image processing operations. The data structure minimizes the necessity of recomputing such information and thus reducing the computation load of the image processing tasks. The image data structure is used as a flexible framework for the development of image processing procedures, as, for example, allowing for the convenience of experimenting with different parameters on different branches of a data structure tree which all originate from the same image data structure node. The flexibility of the data structural approach facilitates error recovery by traversing the data structure linked list in the reverse direction to return to an earlier state in the image processing. The data structures avoid the need to repeatedly carry out computationally demanding tasks as a result of errors. The data structural approach also facilitates adoption of a uniform programming standard for the implementation of image processing subprograms and encourages the use of an object-oriented programming style. Finally, the use of data structures facilitates memory management by allowing memory to be recovered with respect to the representation of images which are no longer required. This is important since images often require significant amounts of computer memory.

Since certain changes may be made in the above processes and apparatus without departing from the scope of the invention herein involved, it is intended that all matter contained in the above description or shown in the accompanying drawing shall be interpreted in an illustrative and not in a limiting sense.

What is claimed is:

1. A method of storing information representative of an image subjected to multiple image data process steps, said method comprising:
   generating a data structure related to information representative of pixel information of at least a portion of the image for each process step so that the data structure includes data (1) for at least doubly-linking all of the data structures associated with the process steps which directly precede or succeed each other, and (2) representing historical information about the image for any and all of the process steps directly preceding the process step associated with each data structure, wherein said step of generating said data structure includes the step of generating data representing statistical information relating to the corresponding image portion.

2. A method according to claim 1, wherein said step of generating data representing statistical information includes the step of generating second-order statistical information.

3. A method according to claim 1, wherein each data structure includes a statistical content and said step of generating data representing statistical information includes the step of generating flags indicating the statistical content of the corresponding data structure.

4. A method according to claim 1, wherein said step of generating data representing statistical information includes the step of generating higher order statistical information.

5. A method according to claim 4, wherein each data structure includes a statistical content and said step of generating data representing statistical information includes the step of generating flags indicating the statistical content of the corresponding data structure.

6. A method of storing information representative of an image subjected to multiple image data process steps, said method comprising:
   generating a data structure related to information representative of pixel information of at least a portion of the image for each process step so that the data structure includes data (1) for at least doubly-linking all of the data structures associated with the process steps which directly precede or succeed each other, and (2) representing historical information about the image for any and all of the process steps directly preceding the process step associated with each data structure, wherein each image portion is defined by parameters and said step of generating said data structure includes the step of generating data representing the parameters of the corresponding image portion.

7. A method according to claim 6, wherein each image portion is stored in a corresponding location in memory and said step of generating data representative of said parameters includes the step of generating data representing the location of the corresponding image portion in memory.

8. A system for storing information representative of an image subjected to multiple image data process steps, said system comprising:
means for generating a data structure related to the information representative of pixel information of at least a portion of the image for each process step, said means for generating said data structure including:
means for generating data for at least doubly-linking all of the data structures associated with the process steps which directly precede or succeed each other,
means for generating data representing historical information about the image for any and all of the process steps directly preceding the process step associated with each data structure and
means for generating data representing statistical information relating to the corresponding image portion.

9. A system according to claim 8, wherein said means for generating data representing statistical information includes means for generating second-order statistical information.

10. A system according to claim 8, wherein each data structure includes a statistical content and said means for generating data representing statistical information includes means for generating flags indicating the statistical content of the corresponding data structure.

11. A system according to claim 8, wherein said means for generating data representing statistical information includes means for generating higher order statistical information.

12. A system according to claim 11, wherein each data structure includes a statistical content and said means for generating data representing statistical information includes means for generating flags indicating the statistical content of the corresponding data structure.

13. A system for storing information representative of an image subjected to multiple image data process steps, said system comprising:
means for generating a data structure related to the information representative of pixel information of at least a portion of the image for each process step, said means for generating said data structure including
means for generating data for at least doubly-linking all of the data structures associated with the process steps which directly precede or succeed each other,
means for generating data representing historical information about the image for any and all of the process steps directly preceding the process step associated with each data structure,
wherein each image portion is defined by parameters and said means for generating said data structure includes means for generating data representing the parameters of the corresponding image portion.

14. A system according to claim 13, wherein each image portion is stored in a corresponding location in memory and said means for generating data representative of said parameters includes means for generating data representing the location of the corresponding image portion in memory.

* * * * *